United States Patent
Kurth et al.

(10) Patent No.: US 9,603,315 B2
(45) Date of Patent: Mar. 28, 2017

(54) DEVICE AND METHOD FOR DETECTING A DRIPPER

(71) Applicant: MAILLEFER SA, Ecublens (CH)

(72) Inventors: Florian Kurth, Chesearux-Noreaz (CH); Axel Donze, l'Isle (CH)

(73) Assignee: MAILLEFER SA, Ecublens (CH)

( * ) Notice: Subject to any disclaimer, the term of this patent is extended or adjusted under 35 U.S.C. 154(b) by 0 days.

(21) Appl. No.: 15/027,747

(22) PCT Filed: Oct. 6, 2014

(86) PCT No.: PCT/EP2014/071290
§ 371 (c)(1),
(2) Date: Apr. 7, 2016

(87) PCT Pub. No.: WO2015/052107
PCT Pub. Date: Apr. 16, 2015

(65) Prior Publication Data
US 2016/0249539 A1 Sep. 1, 2016

(30) Foreign Application Priority Data
Oct. 10, 2013 (CH) ..................... 1731/13

(51) Int. Cl.
*A01G 25/02* (2006.01)
*G01B 11/30* (2006.01)
*G01B 11/14* (2006.01)

(52) U.S. Cl.
CPC ............ *A01G 25/026* (2013.01); *G01B 11/14* (2013.01); *G01B 11/303* (2013.01)

(58) Field of Classification Search
CPC ..... A01G 25/026; G01B 11/14; G01B 11/303
See application file for complete search history.

(56) References Cited

U.S. PATENT DOCUMENTS 5,596,412 A   1/1997   Lex
5,744,779 A   4/1998   Buluschek
(Continued)

FOREIGN PATENT DOCUMENTS

CN    102390061 A    3/2012
EP    0872172 A1    10/1998
GB    2113142 A     8/1983

OTHER PUBLICATIONS

International Search Report for PCT/EP2014/071290 dated Jan. 16, 2015.
(Continued)

*Primary Examiner* — Richard Chang
(74) *Attorney, Agent, or Firm* — Pearne & Gordon LLP

(57) ABSTRACT

A dripper detection device for an irrigation pipe manufacturing system includes a continuous pipe feeder capable of making a pipe equipped with drippers, each dripper having a water outlet. The pipe circulates along a predetermined circulation direction (X-X') while keeping the drippers' water outlets in a predetermined orientation. The dripper detection device includes a laser detection unit with a laser source emitting a laser beam directed to the pipe outer face location where drippers are present at regular intervals, and a laser signal receiver which receives and analyses the laser beam reflected on the pipe outer face to provide a transformed reflected signal which contains information about the passage of each dripper facing said laser detection unit.

11 Claims, 4 Drawing Sheets

(56) References Cited

U.S. PATENT DOCUMENTS

| | | | |
|---|---|---|---|
| 6,280,554 B1 | 8/2001 | Lambert et al. | |
| 8,475,617 B2 * | 7/2013 | Kertscher | B29C 47/028 |
| | | | 156/244.13 |
| 9,340,865 B2 * | 5/2016 | Honda | C23C 14/541 |
| 2012/0301615 A1 | 11/2012 | Honda et al. | |

OTHER PUBLICATIONS

Written Opinion for PCT/EP2014/071290 dated Jan. 16, 2015.
Machine Translation of Chinese Patent No. 100999083A (published on Jul. 18, 2007 and cited to USPTO on Jan. 13, 2017).

* cited by examiner

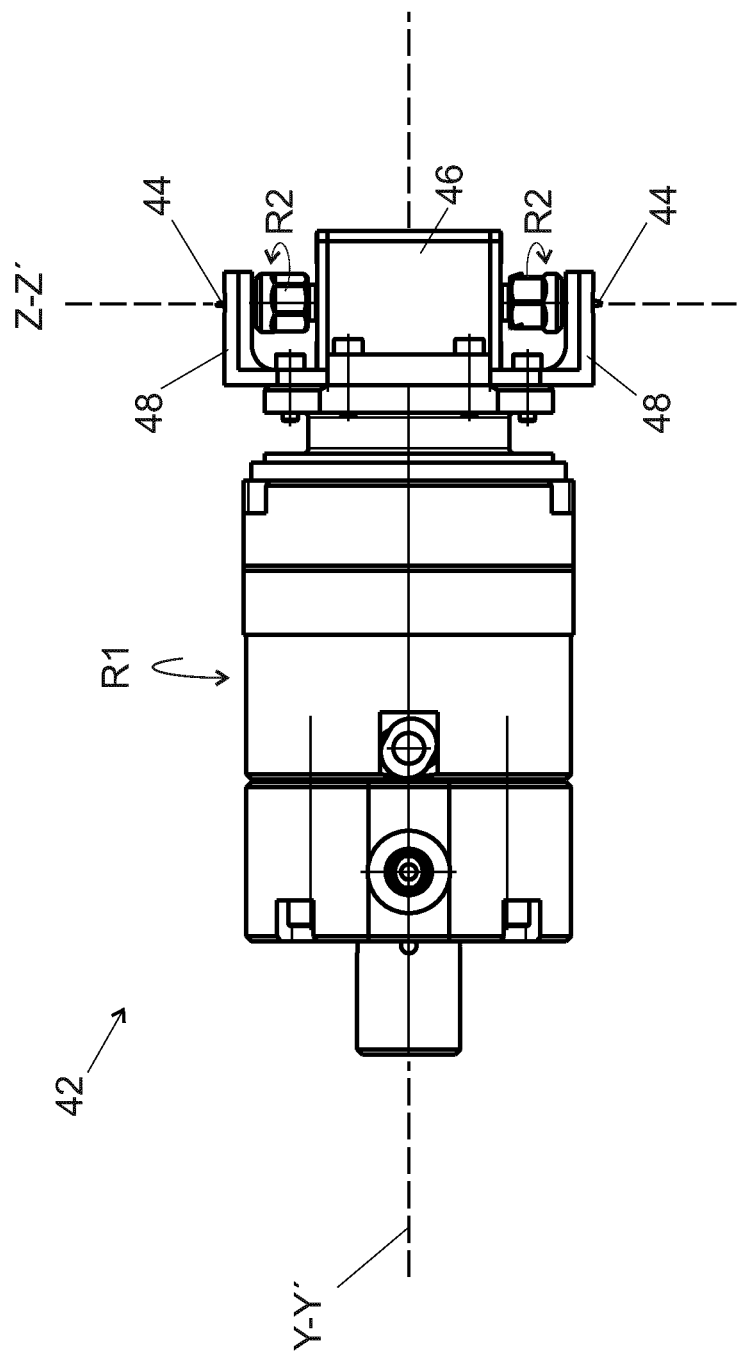

DEVICE AND METHOD FOR DETECTING A DRIPPER

FIELD OF THE INVENTION

The present invention concerns a method for manufacturing an irrigation pipe, in particular a drip irrigation pipe, and a system for manufacturing this irrigation pipe. More precisely, the present invention concerns also a dripper detection method and a device for detecting a dripper, as well as a pipe drilling method and a device for drilling a pipe at a dripper location.

DESCRIPTION OF RELATED ART

Some irrigation techniques use so-called "drip" irrigation pipes or hoses. The expression "drip irrigation pipe" indicates in this context an irrigation pipe, e.g. made of polymeric material, pierced at pre-determined intervals by holes of small diameter, through which water can flow towards the ground. A dripper or drip element, which is a flow limiter, can be provided at each hole for precisely controlling the flow from the holes. It is generally made of plastic material and it is attached to the inner wall of the irrigation pipe during its manufacturing. Such a dripper comprises a watertight wall which defines with the internal face of the pipe a collecting chamber connected to the interior space the pipe by a regulated discharge conduit.

Since irrigation pipes have a fixed cross-sectional profile, an extrusion process is generally used for their manufacturing. A system for manufacturing irrigation pipes generally comprises an extrusion unit, a calibrator unit for regulating the diameter of the pipes, a cooling unit for cooling the pipe—comprising a liquid cooling tank which is some tens meters long and a cooling liquid, e.g. water, inside the tank—and a traction unit for drawing the pipe through the liquid cooling tank. The speed of the irrigation pipe inside the liquid cooling tank is generally higher than 100 m/min, e.g. 150 m/min.

The drippers are regularly fed into the extrusion unit and then into the irrigation pipe by an ejection unit or dripper insertion unit comprising orienting means for feeding the drippers to the extrusion unit along a determined orientation.

A perforating unit is provided for drilling the irrigation pipe at appropriate locations in correspondence of each dripper to make the dripper functional.

A detection unit is associated with the perforation unit to locate precisely the position of each dripper and identify all drilling points along the pipe.

Several detection and drilling systems have been proposed but they are not technically reliable anymore according to more drastic irrigation pipe manufacture specifications, notably with a higher manufacture cadence, such as 1800 to 2000 drippers to be detected per minute, which implies 1800 to 2000 holes to be drilled per minute.

The most common detection method for the dripper consists of a mechanical arm acting on an electrical contact, such as in FIG. 1 of CN 102390061. A mechanical detection system detects the passage of the dripper element due to deformation of the tube. Based on the line speed, the motion of the drilling unit is calculated such that the hole is drilled at the desired part of the dripper.

The same figure also shows the drilling unit in a well known execution where the drill motor is mounted on eccentric cranks, making a plunging and translational movement according to the speed of the pipe moving along.

Such systems are well established and work well for detection and drilling rates up to 800 drippers/min, if carefully designed. At higher rates, inertia effects become so strong that these mechanical detection and drilling systems become unsuitable for the purpose. The reason is that the angular velocity of the eccentric of the drilling unit is continuously accelerating and decelerating during a rotation cycle, making up for significant vibrations with all the mass in movement. More generally, known mechanical detection and drilling systems are not able to work reliably for high rates.

More recent systems such as in U.S. Pat. No. 5,744,779 uses capacitive detectors, taking advantage of variation in dielectric constant, in combination with laser drilling unit. While the laser beam used for drilling is virtually inertia-free and can therefore drill holes at any practical rate, it is expensive and maintenance-intensive. On the other hand, the dripper detection based on capacitance measurement is not suitable for high detection rates.

It is an aim of the present invention to obviate or mitigate one or more of the aforementioned disadvantages.

The aim of the present invention is to provide a dripper detection method and device, a pipe drilling method and device, also with a irrigation pipe drilling system which allow a high rate for dripper detection and pipe drilling in an irrigation pipe manufacturing system, in particular for a rate of 800 drippers per minute and more.

BRIEF SUMMARY OF THE INVENTION

According to the invention, these aims are achieved by means of a dripper detection device according to claim 1, by means of an irrigation pipe drilling system according to claim 9, by means of a method for detecting a dripper position along an irrigation pipe according to claim 14 and by means of a method for drilling an irrigation pipe according to claim 17.

The dripper detection device and the pipe drilling device according to the invention is used for an irrigation pipe manufacturing system comprising a continuous pipe feeder capable of making a pipe equipped with drippers having a water outlet, said pipe circulating along a predetermined circulation direction (X-X') while keeping the drippers' water outlet in a predetermined orientation. In most cases, the drippers are in such a position within the pipe in the pipe feeder that the water outlet is preferably upwardly oriented, which means said predetermined orientation of the water outlet is vertical and forming a Z-Z' axis. The invention is not limited to flat, generally rectangular drippers (in which case the drippers are preferably upwardly oriented), but also applies for tubular or annular, i.e. ring-shaped, drippers.

Said dripper detection device includes a laser detection unit with a laser source emitting a laser beam directed to the pipe outer face location where drippers are present at regular intervals, and a laser signal receiver which receives and analyses the laser beam reflected on the pipe outer face to provide a transformed reflected signal which contain information about the passage of each dripper facing said laser detection unit. These information gives indication about the location of each dripper and therefore of each spot of the pipe wall to be later drilled for creating a hole through the pipe wall at a location corresponding to the drippers' water outlet.

Such a laser based dripper detection device allows a very reliable dripper detection since it can detect quite instantaneously very low change in the pipe profile of the pipe passing in front of the laser detection unit, without contact with the pipe and therefore without interfering with the pipe running at high speed. This very low change of profile of the pipe wall, such as a pipe wall protrusion, is sufficient to give indication about the precise location of the dripper inside the pipe, behind the pipe wall, upstream of the drilling unit, i.e. before drilling a hole through the pipe wall at a predetermined location corresponding to the water outlet of each dripper. Also a laser based dripper detection device is an optical detection means which does not vibrate whereas a lot of known dripper detection devices are mechanically working and are inherently subject to vibrations when working at high speed. This situation allows to make the dripper detection possible for high or very high dripper rate per minute, namely more than 800 drippers detected per minute until 2000 drippers detected per minute or even more.

Said pipe drilling device includes a rotary drilling unit which rotates around an axis of rotation (for instance Y-Y') which is orthogonal to said pipe circulation direction (for instance X-X') and to said dripper orientation (for instance Z-Z'), said rotary drilling unit being equipped with at least one drilling tool and being distant from the pipe so that said drilling tool is able to drill a hole in the pipe wall at a location of a dripper when the angular position of the drilling tool corresponds to the closest position from the pipe, which drilling position is a contact position between the pipe wall and the end of the drilling tool.

Such a rotary based pipe drilling device allows a very efficient drilling operation since there is no need for a forward piercing stroke followed by a backward stroke before implementing a new forward piercing stroke which alternating motion implies vibrations. Advantageously, for limiting and avoiding any out-of-balance of the rotating parts, the mass is distributed so as to be centred on the axis of rotation of the rotary drilling unit. Also, such a rotary based pipe drilling device allows a high precision in the drilling tool height since the rotational motion belongs to a circular path having a constant radius which can be chosen, set and then kept unchanged for a whole continuous manufacture period. In summary, the masses are concentrated nearest to the rotation axis, which minimizes inertia effects, and there are no need for reciprocating masses, which avoids vibrations.

In a preferred embodiment the rotary drilling unit rotates around said rotation axis (for instance Y-Y') according to a unique rotation direction. The rotary drilling unit rotary motion has a variable rotation speed in order to be adapted to the velocity of the tube during the drilling phase and to the spacing of the drippers and the velocity of the tube in-between two drilling phases. As an alternative, said rotary drilling unit is rotating around said rotation axis Y,Y' according to a motion alternatively clockwise and anti-clockwise, in which the direction of rotation changes after the drilling of each hole in the pipe.

Such an alternating rotary motion is as a pendulum movement and allows a shorter time between two successive passages of the drilling tool in the drilling position of the drilling tool, which corresponds to the closest position of the drilling tool with respect to the pipe, which is a position with contact, notably a downward drilling position of the drilling or piercing tool.

In a preferred embodiment, the rotation speed of the rotary drilling unit around said axis of rotation (for instance Y-Y') is decelerating before each change of rotation direction and accelerating after each change of rotation direction. By having such changes in the rotation speed of the rotary drilling unit, it is possible to adapt the rhythm rotation motion to the exact required drilling moment, i.e. when the drilling location of the pipe faces the rotary drilling unit in the drilling position of the drilling tool.

In another preferred embodiment, said rotary drilling unit is further equipped with a stop element against which said pipe comes into contact in order to limit the drilling depth of the drilling tool. Such provision secure the drilling depth of the drilling tool, avoiding any too deep drilling that can damage the dripper by a drilling not only making a hole through the pipe wall but also damaging the wall of the dripper.

According to another aspect, the invention concerns an irrigation pipe drilling system comprising a pipe drilling device with a rotary drilling unit as previously or hereinafter mentioned and a dripper detection device placed upstream said pipe drilling device and comprising any detection means able to detect each dripper location so that said pipe drilling device is able to drill a hole on the pipe wall at a predetermined location corresponding to the water outlet of said dripper.

In a preferred embodiment, said dripper detection device includes a laser detection unit with a laser source emitting a laser beam directed to the pipe outer face location where drippers are present at regular intervals, and a laser signal receiver which receives and analyses the laser beam reflected on the pipe outer face to provide a transformed reflected signal which contains information about the passage of each dripper facing said laser detection unit.

Advantageously, said dripper detection device further includes a stabilizing unit placed upstream and/or downstream of the laser detection unit for having a determined and constant angular orientation and a determined and constant distance from said laser detection unit of the pipe section facing said laser detection unit. The higher the precision of the angular orientation of the pipe section facing said laser detection unit and the higher the precision the distance from said laser detection unit of the pipe section facing said laser detection unit, the lower is the risk of drilling out of the collecting chamber of the dripper, i.e. in another part of the dripper or in a portion of the pipe without any dripper.

According to another aspect, the invention concerns an irrigation pipe drilling system comprising a laser based dripper detection device as previously or hereinafter mentioned and a pipe drilling device placed downstream said dripper detection device and comprising any drilling means able to drill a hole on the pipe wall for each dripper at a predetermined location corresponding precisely to the water outlet of said dripper. The water outlet is connected to the collecting chamber of the dripper so that the allowance for the drilling location in the pipe wall depends on the size of said collecting chamber.

In a preferred embodiment, said pipe drilling device is able to use said transformed reflected signal to control the drilling location of said holes along said pipe.

In a preferred embodiment, said pipe drilling device includes a rotary drilling unit which rotates around an axis of rotation (for instance Y-Y') which is orthogonal to said pipe circulation direction (for instance X-X') and to said dripper orientation (for instance Z-Z'), said rotary drilling unit being equipped with at least one drilling tool and being distant from the pipe so that said drilling tool is able to drill a hole in the pipe wall at a location of a dripper when the angular position of the drilling tool corresponds to the closest position from the pipe.

In a preferred embodiment, said rotary drilling unit includes a double-head spindle whose two ends are equipped with one drilling tool.

In another preferred embodiment, said rotary drilling unit is further equipped with a stop element against which said pipe comes into contact in order to limit the drilling depth of the drilling tool.

According to another aspect, the invention concerns a method for detecting a dripper position along an irrigation pipe continuously running along an irrigation pipe manufacturing system, comprising:
  keeping said irrigation pipe circulating along a predetermined circulation direction (for instance X-X') while keeping the drippers' water outlet in a predetermined dripper orientation (for instance Z-Z'),
  emitting a laser beam directed to the pipe outer face location where drippers are present at regular intervals,
  receiving and analysing the laser beam reflected on the pipe outer face to provide a transformed reflected signal which contain information about the passage of each dripper facing said laser detection unit.

In a preferred embodiment, said detection method further comprises stabilizing said pipe for having a determined and constant angular orientation and a determined and constant distance from said laser detection unit of the pipe section facing said laser detection unit.

In a preferred embodiment, said detection method further comprises deforming said pipe at least at dripper location before it arrives to said laser detection unit. Such a temporary deformation can help the dripper detection by enhancing the local outer face relief of the pipe wall created by the dripper's presence, namely the protrusion or embossment and/or depression or hollow formed in the outer face of the pipe wall, also concave and/or convex outer face portions. This situation is particularly helpful for pipe having thick walls, namely equal to or above 0.20 mm thickness walls and for which the presence of the dripper is not or not much naturally visible. This provision can nevertheless being applied for pipe with less thick wall, i.e. with a wall having a thickness below 0.20 mm.

In a preferred embodiment of said method for drilling an irrigation pipe at dripper locations, the detection of the drippers is performed according to a method for detecting a dripper as previously or hereinafter mentioned.

According to another aspect, the invention concerns a method for drilling an irrigation pipe equipped with drippers having a water outlet, said pipe continuously running along an irrigation pipe manufacturing system, comprising
  keeping said irrigation pipe circulating along a predetermined circulation direction (for instance X-X') while keeping the drippers' water outlet in a predetermined dripper orientation (for instance Z-Z'),
  providing a rotary drilling unit equipped with at least one drilling tool, and being distant from the pipe so that said drilling tool is able to drill a hole in the pipe wall at a location of a dripper when the angular position of the drilling tool corresponds to the closest position from the pipe,
  making said rotary drilling unit to rotate around an axis of rotation (for instance Y-Y') which is orthogonal to said circulation direction (for instance X-X') and to said dripper orientation (for instance Z-Z'),
  drilling holes in the pipe wall at each location of a dripper when the angular position of the drilling tool is the closest from the pipe.

In a preferred embodiment of said method for drilling an irrigation pipe at dripper locations, said rotary drilling unit further includes a double-head spindle whose two ends are equipped with one drillings tool and wherein said drilling step is implemented by using alternatively each of said two drilling tools.

In a preferred embodiment of said method for drilling an irrigation pipe at dripper locations, said drilling step is implemented with said rotary drilling unit rotating around said rotation axis (for instance Y,Y') according to a unique rotation direction. As an alternative, said drilling step is implemented with said rotary drilling unit rotating around said rotation axis (for instance Y,Y') according to a motion alternatively clockwise and anti-clockwise, in which the direction of rotation changes after the drilling of each hole in the pipe.

BRIEF DESCRIPTION OF THE DRAWINGS

The invention will be better understood with the aid of the description of an embodiment given by way of example and illustrated by the figures, in which:

FIG. 4 shows a lateral view of the rotary drilling unit of FIG. 3.

DETAILED DESCRIPTION OF POSSIBLE EMBODIMENTS OF THE INVENTION

Figure 1:
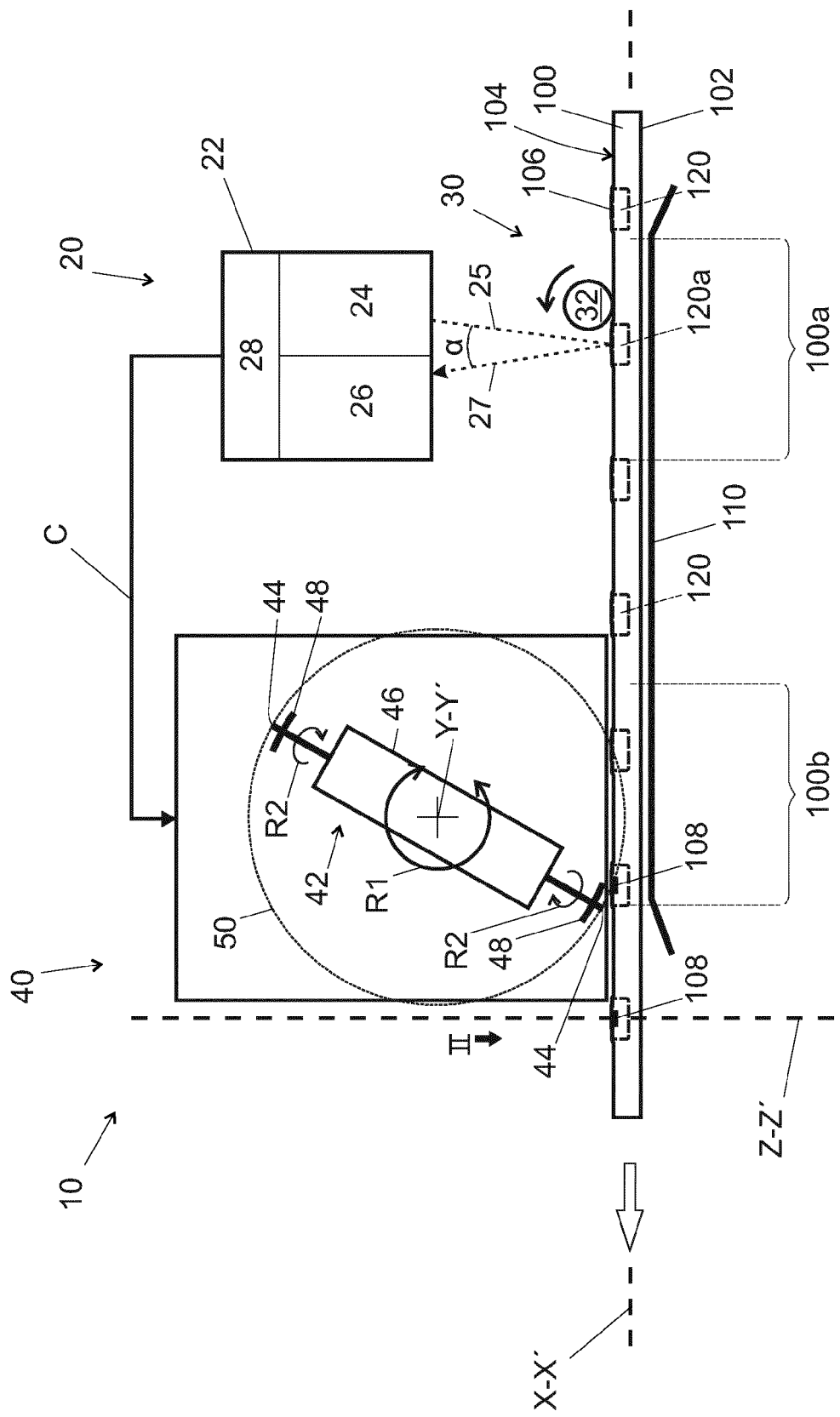
FIG. 1 shows one embodiment of the irrigation pipe drilling system according to the invention containing the dripper detection device and the pipe drilling device according to the invention.

The irrigation pipe drilling system 10 schematically shown in FIG. 1 comprises a dripper detection device 20 (on the right) and a pipe drilling device 40 (on the left). This irrigation pipe drilling system 10 is placed facing an irrigation pipe 100 running along a path whose portion facing irrigation pipe drilling system 10 is represented in a non-limitative way as being horizontal and linear, parallel to a circulation direction shown here identical to an axis X-X'. This irrigation pipe 100 is supported by a support element 110.

The irrigation pipe 100 contains drippers 120 placed inside said irrigation pipe 100 while being fixed to the inner face of the pipe wall 102. As shown in FIG. 1, preferably, drippers 120 are placed inside said irrigation pipe 100 at regular and constant intervals in the running portion of the pipe. In some cases, the drippers 120 are placed inside said irrigation pipe 100 at regular but not constant intervals in the running portion of the pipe: for instance with successively a first segment of pipe having drippers at constant intervals and, following the first segment, a second segment of pipe without drippers. Usually, during the manufacture of the irrigation pipe 100, there is no dripper in the first manufactured section and the last manufactured section. In the shown embodiment, the drippers 120 are placed at the upper part of the irrigation pipe 100, i.e. the drippers 120 are upwardly oriented.

Figure 2:
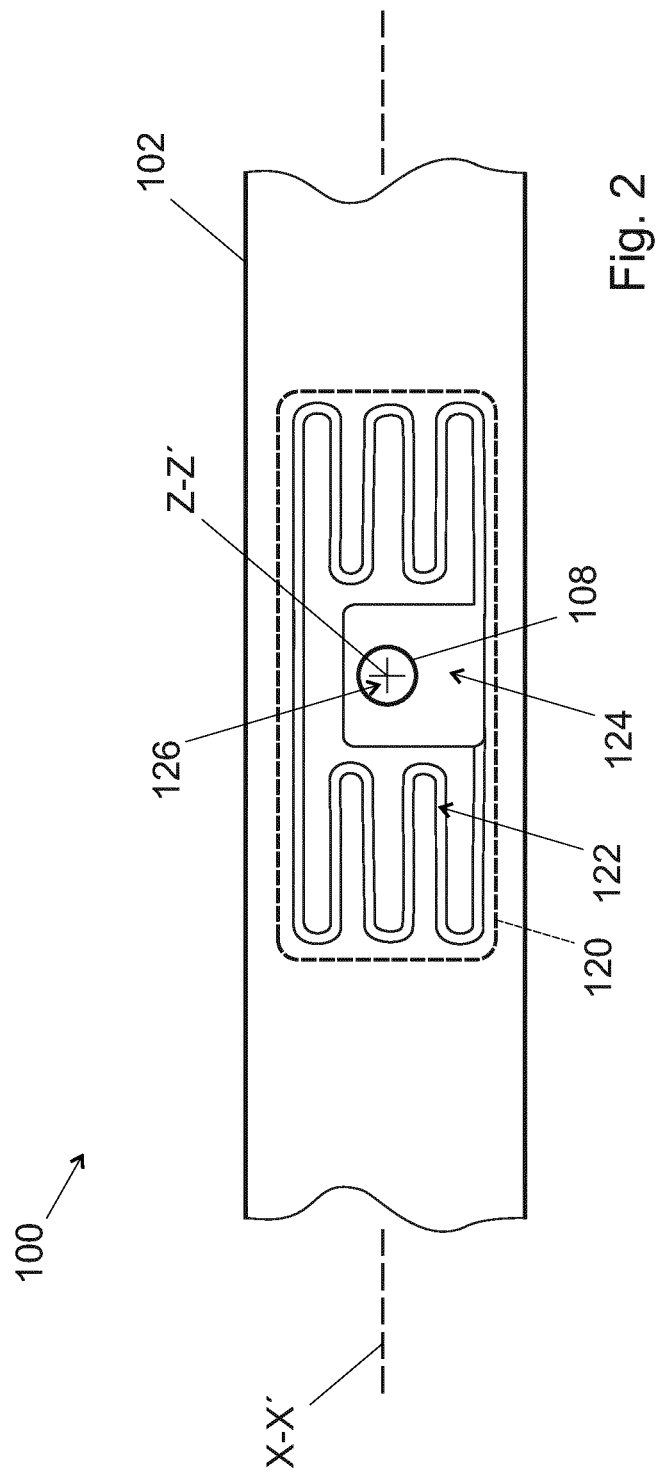
FIG. 2 shows a upper view of a section of an irrigation pipe with a hole drilled according to the method for drilling an irrigation pipe according to the invention, and with a dripper.

More precisely, as shown in FIG. 2, the drippers 120 are placed so that the labyrinth 122 and the collecting chamber 124 are also upwardly oriented and delimited by walls of the drippers 100 and by top portion of the pipe wall 102.

As can be seen in FIG. 1, the presence of the drippers 120 creates a natural local deformation 106 of the pipe wall 102, here a visible protrusion of the outer face 104. This local deformation 106 may or may not be naturally visible at the outer face 104 of the pipe wall 102, depending mainly of the thickness of this pipe wall 102.

According to the invention, the dripper detection device 20 is a laser based detection device, comprising a laser detection unit 22 facing a pipe section 100a and provided with:
   a laser source 24 emitting a laser beam 25 directed to the pipe outer face 104 location where drippers 120 are present at regular intervals, (in FIG. 1, the laser beam 25 is directed towards the pipe outer face 104 at the location of a dripper 120a currently detected), and
   a laser signal receiver 26 which receives and analyses the laser beam reflected 27 on the pipe outer face 104 to provide a transformed reflected signal which contain information about the passage of each dripper 120 facing said laser detection unit 22.

This way, a change in the reflected beam 27 received by said laser signal receiver 26 indicates the appearance or the disappearance of a dripper 120 at the contact location of the emitted laser beam 25 on the pipe outer face 104, thereby creating a reception signal dependent from the presence and the absence of a dripper 120 at said contact location, namely the presence and the absence of a natural local deformation 106 of the pipe wall 102. For instance, the distance between the laser source 24 and the pipe outer face 104 is continuously measured at said contact location by laser triangulation according to the well-known method which uses the triangulation alpha ($\alpha$) angle formed between the emitted laser beam 25 and the reflected laser beam 27.

This reception signal is then decoded and transformed by the laser signal receiver 26 to provide said transformed reflected signal which contains information about the passage of the dripper 120a facing said laser detection unit 22. This information is preferably a time based information, for instance an elapsed time since a reference time, and/or a location based information, for instance a pipe length already seen by the laser detection unit 22 or a distance covered by the irrigation pipe 100 from a reference position on the irrigation pipe 100, and is related to the passage of each dripper 120 detected by said laser detection unit 22.

Preferably, said dripper detection device 20 further includes a stabilizing unit 30 placed upstream or downstream or both upstream and downstream of the laser detection unit 22 for having a determined and constant angular orientation and a determined and constant distance from said laser detection unit 22 of the irrigation pipe 100a section facing said laser detection unit 22. Stabilization of the irrigation pipe 100a section facing said laser detection unit 22 is important for the laser detection to be accurate and therefore reliable for later correct drilling of the irrigation pipe 100.

According to a first variant said stabilizing unit 30 is placed upstream of the laser detection unit 20 and is also able to slightly deform the irrigation pipe 100 at least at dripper locations before it arrives to said laser detection unit 20. This deformation 106 of the pipe wall 102 is a temporary deformation which is performed or not, depending notably on the pipe wall thickness, in the pipe wall material, and on the amount of pressure applied by the stabilizing unit 30.

In the embodiment shown on FIG. 1, said stabilizing unit 30 is placed upstream of the laser detection unit 22 and comprises a roller 32 pressing with a predetermined force on the pipe outer face 104 at a radial location of the pipe 100 where drippers 120 are present at regular intervals. This roller 32 stabilizes in all cases the position of the irrigation pipe 100 to be drilled before implementation of the dripper detection, and in some cases this roller also carries out a deformation 106 of the upper portion of the pipe wall 102 downstream and then upstream of each dripper 120. This roller 32 can be used as only or in addition to other stabilizing and/or deforming element In a not shown embodiment, said stabilizing unit is placed upstream of the laser detection unit 20 and comprises a pipe-bending passage in which said pipe circulates. Such a pipe-bending passage can have different shape, notably an undulating shape with up and down bends that can be created by bending the pipe in one or several winding sections. This pipe-bending passage can be used as only or in addition to other stabilizing and/or deforming element.

In another not shown embodiment, said stabilizing unit 20 comprises a funnel placed upstream and/or downstream of the laser detection unit 22 and in which said pipe 100 circulates. Such a funnel is another way for stabilizing the pipe and can be used as only or in addition to other stabilizing element.

Preferably, as shown in FIG. 1, the dripper detection device 20 further comprises a drilling control unit 28 that is able to use said information of the transformed reflected signal to control the drilling sequence of a pipe drilling device 40. For instance, said drilling control unit 28 is able to use said transformed reflected signal as a drilling control signal containing a drilling top signal which activates the drilling operation/drilling motion of the drilling tool 44, and particularly adapts the rotation velocity of the rotary drilling unit. Preferably, the drilling tools 44 are each drilling the pipe wall 102 during two separate but successive drilling phases, by rotating in the same direction (shown as being anticlockwise in FIGS. 1, 3 and 4) when looking at the end of the drilling tools 44, which correspond to different rotation directions when looking at the whole rotary drilling unit 42 (from the point of view shown on FIGS. 3 and 4)

Such a pipe drilling device 40 is placed downstream said dripper detection device 20 and comprises a rotary drilling unit 42 which rotates around an horizontal axis of rotation Y-Y' which is orthogonal to said horizontal circulation direction X-X' of the irrigation pipe and to the vertical dripper orientation Z-Z' (see arrow R1 on FIG. 1). Said rotary drilling unit 42 is equipped with two drilling tools 44 placed in a diametrically opposite configuration, at the same distance from said axis of rotation Y-Y' of the rotary drilling unit 42. Also, said rotary drilling unit 42 is placed at a distance from the pipe 100 so that said drilling tools are both able to drill a hole 108 in the pipe wall 102 at a location of a dripper 120 when the angular position of the drilling tool around said axis of rotation Y-Y' corresponds to the closest position from the pipe 100. In this closest position, the end of the drilling tool 44 contacts and penetrate the pipe wall 102 at a pipe section 100b facing said rotary drilling unit 42, to pierce this pipe wall 102, while not piercing the dripper wall. More precisely, as can be seen from FIG. 2 the hole 108 is drilled at a location of the pipe wall 102 forming a water outlet 126 for the dripper 120 by being placed facing the collecting chamber 124 of the dripper, thereby allowing the water flow to escape from the pipe 100.

In the illustrated embodiment, said drilling tool 44 is a drill bit further performing a rotating motion around its own longitudinal axis (see arrows R2 on FIG. 1). A preferred shape for the drill bit end correspond to a bevelled end with an outline having an elliptical or a spoon shape. Also the drill-bit can have a hollow configuration at its end such as a trepan in order to have an easy cutting and discharge of the cut portion of the pipe wall 102.

According to a not-shown embodiment, said drilling tool is a punch die elastically pushed towards said pipe wall when the rotative drilling unit 22 arrives at a radial position turned towards said pipe 100. In addition to rotation around said rotation axis Y-Y', such a drilling tool implements also a forward stroke when facing the dripper location so that in the lowest position of the punch the pipe wall 102 is drilled, and a subsequent reverse stroke that intervene later at an higher position of the punch. This higher position of the punch can either be a slightly higher position, being still a contact position with the pipe wall 102, or a significant higher position, being not a contact position with the pipe wall 102. This situation corresponds to an up and down movement, and more generally to a forward and backward stroke, of the drilling tool 44 which is combined with the rotary motion of the drilling unit 42. As an alternative, this punch die can also rotate around its own longitudinal direction as conventional drill-bits, combining therefore a plunging motion and a rotating motion of the drilling tool(s) 44. The drilling tool can have therefore several implementations, including a rotating drilling tool, i.e. a drilling tool rotating around its own longitudinal axis.

Figure 3:
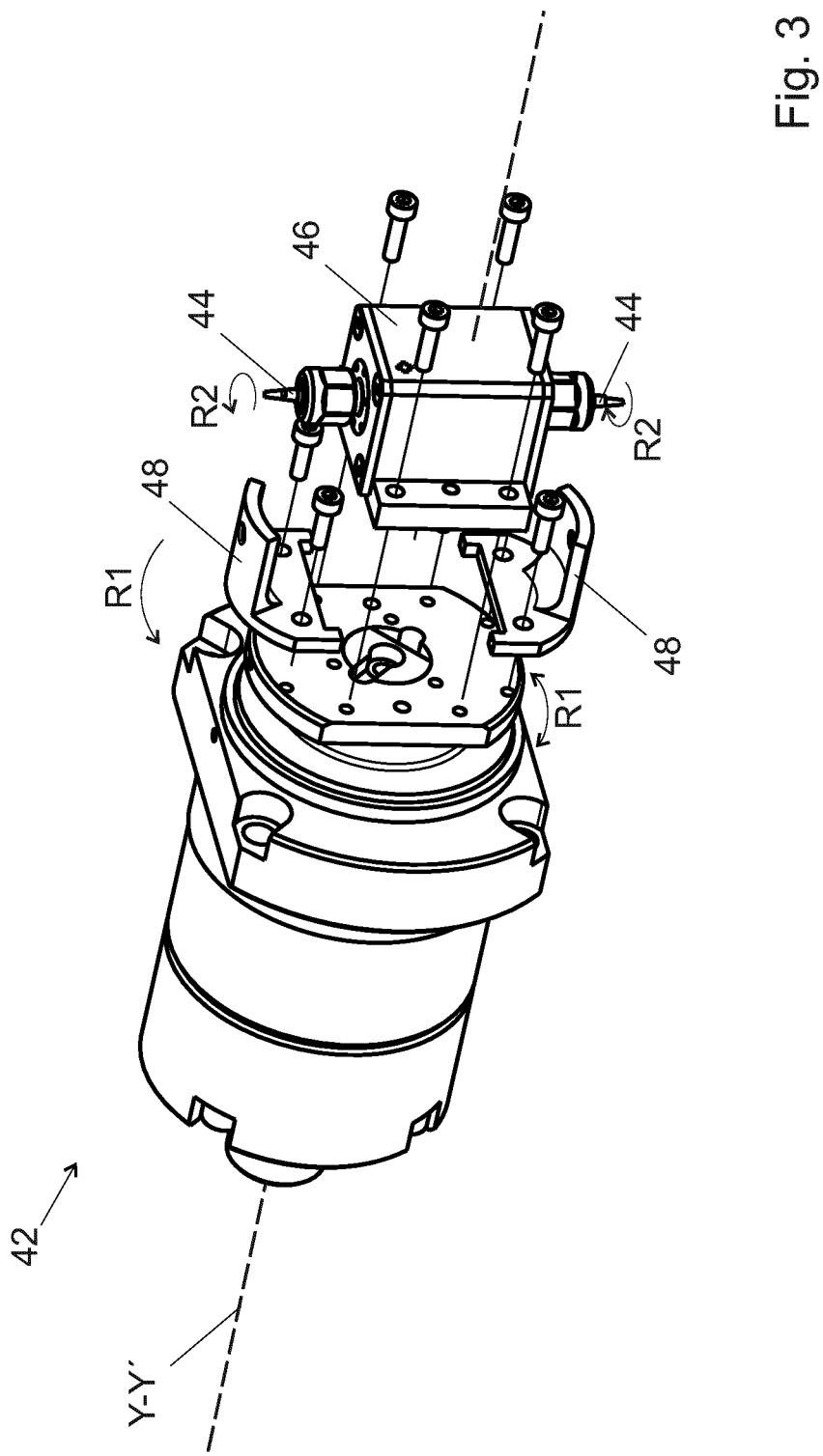
FIG. 3 shows an exploded view of a possible embodiment for the rotary drilling unit.

As can been seen in FIGS. 1, 3 and 4 and according to a preferred embodiment, said rotary drilling 42 unit includes a double-head spindle 46 whose two ends are equipped with one drilling tool 44, said drilling tools 44 being shown as drill-bits.

As can been seen in FIGS. 1, 3 and 4 and according to another preferred embodiment, said rotary drilling 42 unit comprises a stop element 48 placed along the drill bit (more generally the drilling tool 44), behind the tip of the drill bit, at a distance from the tip of the drill bit corresponding to the maximum drilling depth. This stop element 48 can come into contact with the outer face 104 of the pipe 100, depending from the initial distance (height along vertical Z-Z' direction in FIG. 1) adjustment between the pipe 100 and the pipe drilling device 40 and any possible variation of such distance (height along vertical Z-Z' direction in FIG. 1).

In order to perform a clean and quite circular hole, the rotation speed of the rotary drilling unit 42 around the axis of rotation Y-Y' is preferably such that as the linear speed of the drilling tool 44 along its arc-shaped path 50 (or circular path) is sensibly the same as the linear speed of the pipe 100 circulating along said circulation direction X-X' in the pipe drilling device 40 when said drilling tool 44 is in the closest position from the pipe 100, i.e. in contact with the pipe 100, which means in the lowest position for the embodiment shown in FIGS. 1 to 4.

According to a preferred provision of the drilling method according to the invention, a drilling sequence (using or not the pipe drilling device 40 or any previously described alternative) is combined with a dripper detection sequence, implemented before said drilling sequence for making a given hole, said dripper detection sequence using said described dripper detection device 20 for detecting the dripper 120 corresponding to said given hole, according to the following steps:
  emitting a laser beam directed to the pipe outer face 104 location where drippers 120 are present at regular intervals,
  receiving and analysing the laser beam 27 reflected on the pipe outer face 104 to provide a transformed reflected signal which contain information about the passage of each dripper 120 facing said laser detection unit 22.

Also, according to a preferred provision of the drilling method according to the invention, said transformed reflected signal is used (arrow C) for controlling the rotation of said rotary drilling unit 42 in order to drill a hole 108 through the pipe wall 102 for each dripper 120 at a predetermined location corresponding to the water outlet of said dripper 120. This predetermined location of the pipe facing said drilling device 40 derives from said transformed reflected signal which is used by said drilling control unit 28 to calculate from the information contained in the transformed reflected signal, the moment for performing the drilling at the right place of the pipe wall 102 and adapt in consequence the rotary speed of the rotary drilling unit 42 in function of the current angular position, rotation speed and direction of rotation of the rotary drilling unit 42. The rotary drilling unit 42 is moveable according to a rotation motion where the angular velocity (the rotary speed) of the rotary drilling unit 42 is varying according to the velocity of the tube 100 during the drilling phase and to the spacing of the drippers 120 and the velocity of the tube in-between two drilling phases.

The present invention also concerns a method for drilling an irrigation pipe wherein the detection of the drippers is performed to any of previously described dripper detection method, wherein it further comprises using said transformed reflected signal for controlling the drilling sequence of a pipe drilling device placed downstream said dripper detection device and comprising any drilling means able to drill a hole on the pipe wall for each dripper at a predetermined location corresponding to the water outlet of said dripper. Here, it is to be understood that the pipe drilling device can use a drilling unit which is not a rotary drilling unit.

According to a preferred provision of the drilling method according to the invention, a drilling sequence is combined with a dripper detection sequence (using or not the dripper detection device 20 or any previously described alternative) implemented before said drilling sequence for making a given hole 108, said drilling sequence having the following steps:
  providing a rotary drilling unit 42 equipped with at least one drilling tool 44, and being distant from the pipe 100 so that said drilling tool 44 is able to drill a hole 108 in the pipe wall 102 at a location of a dripper 120 when the angular position of the drilling tool 44 around said axis of rotation (Y-Y') corresponds to the closest position from the pipe 100,
  making said rotary drilling unit 42 to rotate around an axis of rotation (Y-Y') which is orthogonal to said circulation direction (X-X') and to said dripper orientation (Z-Z'),
  drilling holes 108 in the pipe wall at each location of a dripper 120 when the angular position of the drilling tool 44 around said axis of rotation (Y-Y') is the closest from the pipe 100, which corresponds preferably to the lowest position of the drilling tool 44. Here, it is to be understood that the pipe drilling device can use a detection unit which is not a laser detection unit.

In the illustrated embodiment the pipe circulation direction X-X', the axis of rotation Y-Y' of the rotary drilling and the dripper orientation Z-Z' are orthogonal taken as pairs and form together a 3D Cartesian rectangular coordinate system but other geometrical arrangements are possible.

In said previously mentioned method for drilling an irrigation pipe, drilling step is preferably implemented with said rotary drilling unit 42 rotating around said rotation axis Y,Y' according to a unique rotation direction. As an alternative, said rotary drilling unit 42 is rotating around said rotation axis Y,Y' according to a motion alternatively clockwise and anti-clockwise, in which the direction of rotation changes after the drilling of each hole 108 in the pipe wall 102.

A possible embodiment for a rotary drilling unit 42 is shown in more details in FIGS. 3 and 4.

REFERENCE NUMBERS USED ON THE FIGURES

10 Irrigation pipe drilling system
100 irrigation pipe (100)
100*a* pipe section facing said laser detection unit
100*b* pipe section facing said rotary drilling unit
102 pipe wall
104 pipe outer face
106 Deformation of the pipe outer face
108 Hole drilled in the irrigation pipe wall
110 support element
120 dripper
120*a* dripper currently detected
122 labyrinth
124 Collecting chamber
126 water outlet
20 Dripper detection device
22 laser detection unit
24 laser source
25 Emitted laser beam
26 laser signal receiver
27 reflected laser beam
28 drilling control unit
30 stabilizing unit
32 roller
40 pipe drilling device
42 rotary drilling unit
44 drilling tool (drill bit)
46 double-head spindle
48 stop element
50 arc-shaped path (or circular path)

What is claimed is:

1. An irrigation pipe manufacturing system comprising:
   a continuous pipe feeder, wherein an irrigation pipe circulates along a predetermined circulation direction X-X' in the pipe feeder, and a plurality of drippers each having a water outlet are placed inside the irrigation pipe by said pipe feeder to form deformations on the pipe wall, and the irrigation pipe circulates while keeping the water outlets of the drippers in a predetermined orientation;
   a dripper detection device having a laser detection unit and a laser signal receiver, wherein the laser detection unit has a laser source emitting a laser beam directed to a location of the irrigation pipe's outer surface where deformations are present at regular intervals, and the laser signal receiver receives and analyses the laser beam reflected on the pipe's outer surface to provide a transformed reflected signal which contains information about the passage of each dripper facing said laser detection unit; and
   a pipe drilling device placed downstream said dripper detection device and comprising drilling means able to drill a hole through the pipe wall for each dripper at a predetermined location corresponding to the water outlet of each dripper,
   wherein said dripper detection device further comprises a drilling control unit using said transformed reflected signal as a drilling control signal to control the drilling location of said holes along said pipe by said drilling device.

2. The irrigation pipe manufacturing system according to claim 1, wherein the system further includes a stabilizing unit placed upstream and/or downstream of the laser detection unit for having a determined and constant angular orientation and a determined and constant distance between said laser detection unit and a pipe section facing said laser detection unit.

3. The irrigation pipe manufacturing system according to claim 2, wherein said stabilizing unit is placed upstream of the laser detection unit and comprises a roller pressing with a predetermined force on the pipe outer surface at a radial location where drippers are present at regular intervals.

4. The irrigation pipe manufacturing system according to claim of claim 2, wherein said stabilizing unit comprises a funnel placed upstream and/or downstream of the laser detection unit and in which said pipe circulates.

5. The irrigation pipe manufacturing system according to claim 1, wherein said stabilizing unit is placed upstream of the laser detection unit and is able to slightly deform the pipe at least at dripper locations before it arrives to said laser detection unit.

6. The irrigation pipe manufacturing system according to claim 1, wherein said drilling control unit uses said information of the transformed reflected signal to control the drilling sequence of said pipe drilling device.

7. The irrigation pipe manufacturing system according to claim 1, wherein said information is a time based information and/or a location based information related to the passage of each dripper detected by said laser detection unit.

8. An irrigation pipe manufacturing system comprising:
   a continuous pipe feeder, wherein an irrigation pipe circulates along a predetermined circulation direction X-X' in the pipe feeder, and a plurality of drippers each having a water outlet are placed inside the irrigation pipe by said pipe feeder, and the irrigation pipe circulates while keeping the water outlets of the drippers in a predetermined orientation;
   a dripper detection device having a laser detection unit and a laser signal receiver, wherein the laser detection unit has a laser source emitting a laser beam directed to a location of the irrigation pipe's outer surface where drippers are present at regular intervals, and the laser signal receiver receives and analyses the laser beam reflected on the pipe's outer surface to provide a transformed reflected signal which contains information about the passage of each dripper facing said laser detection unit;
   a pipe drilling device placed downstream said dripper detection device and comprising drilling means able to drill a hole through the pipe wall for each dripper at a predetermined location corresponding to the water outlet of each dripper,
   wherein said dripper detection device further comprises a drilling control unit using said transformed reflected signal as a drilling control signal to control the drilling location of said holes along said pipe by said drilling device,
   wherein the system further includes a stabilizing unit placed upstream and/or downstream of the laser detection unit for having a determined and constant angular orientation and a determined and constant distance between said laser detection unit and a pipe section facing said laser detection unit, wherein said stabilizing unit is placed upstream of the laser detection unit and comprises a pipe-bending passage in which said pipe circulates.

9. An irrigation pipe manufacturing system comprising:
- a continuous pipe feeder, wherein an irrigation pipe circulates along a predetermined circulation direction X-X' in the pipe feeder, and a plurality of drippers each having a water outlet are placed inside the irrigation pipe by said pipe feeder, and the irrigation pipe circulates while keeping the water outlets of the drippers in a predetermined orientation;
- a dripper detection device having a laser detection unit and a laser signal receiver, wherein the laser detection unit has a laser source emitting a laser beam directed to a location of the irrigation pipe's outer surface where drippers are present at regular intervals, and the laser signal receiver receives and analyses the laser beam reflected on the pipe's outer surface to provide a transformed reflected signal which contains information about the passage of each dripper facing said laser detection unit;
- a pipe drilling device placed downstream said dripper detection device and comprising drilling means able to drill a hole through the pipe wall for each dripper at a predetermined location corresponding to the water outlet of each dripper, wherein said dripper detection device further comprises a drilling control unit using said transformed reflected signal as a drilling control signal to control the drilling location of said holes along said pipe by said drilling device, wherein said pipe drilling device includes a rotary drilling unit which rotates around an axis of rotation Y-Y' which is orthogonal to said circulation direction X-X' and to said dripper orientation Z-Z', said rotary drilling unit being equipped with at least one drilling tool and being distant from the pipe so that said drilling tool is able to drill a hole in the pipe wall at a location of a dripper when the angular position of the drilling tool corresponds to the closest position from the pipe.

10. The irrigation pipe manufacturing system according to claim 9, wherein said rotary drilling unit includes a double-head spindle whose two ends are equipped with one drilling tool.

11. The irrigation pipe manufacturing system according to claim 9, wherein said rotary drilling unit is further equipped with a stop element against which said pipe comes into contact in order to limit the drilling depth of the drilling tool.

* * * * *